United States Patent

[11] 3,582,652

[72] Inventor Richard C. McCall
Woodside, Calif.
[21] Appl. No. 2346
[22] Filed Jan. 12, 1970
[45] Patented June 1, 1971
[73] Assignee The United States of America as represented by the United States Atomic Energy Commision

[54] METHOD FOR READING A THERMOLUMINESCENT DOSIMETER
8 Claims, No Drawings

[52] U.S. Cl........................................ 250/71R, 250/83 R
[51] Int. Cl........................................ G01t 1/11
[50] Field of Search............................ 250/71 R, 83 CD, 83 R

[56] References Cited
UNITED STATES PATENTS
3,376,416 4/1968 Rutland et al. .............. 250/71X
3,471,699 10/1969 McCall......................... 250/71
3,480,776 11/1969 Attix ............................ 250/83X
3,484,605 12/1969 Attix ............................ 250/71
3,487,209 12/1969 Perry............................ 250/83X Primary Examiner—Archie R. Borchelt
Attorney—Roland A. Anderson ABSTRACT: A method for reading the exposure of radiation sensitive thermoluminescent material to X-radiation or radiation from a radioactive source, comprising the steps of very rapidly heating the material to a temperature slightly above the temperature of peak luminescence, evenly maintaining the material at the attained temperature for a period that extends at least to the termination of luminescence of the material, and sensing the total luminescence of the material.

The invention disclosed herein was made under, or in the course of Contract No AT(04-3)-400 with the UNITED STATES ATOMIC ENERGY COMMISSION.

METHOD FOR READING A THERMOLUMINESCENT DOSIMETER

BACKGROUND OF THE INVENTION

The present invention relates to an improved method for reading the radiation exposure of a thermoluminescent dosimeter by heating the dosimeter to follow a step function that results in a maximum temperature of the dosimeter that is only slightly above the temperature of peak luminescence.

Certain materials, such as magnesium-activated lithium fluoride and manganese-activated calcium fluoride, are known as thermoluminescent materials. Upon heating these materials after their exposure to X-radiation or other ionizing radiation, the materials emit an amount of light that is proportional to the total amount of radiation to which the materials have been exposed. Such materials are useful in dosimeters for monitoring the total exposure of devices, environments or biological entities over a predetermined period. The usual practice in reading such a dosimeter is to place the dosimeter in a heating element and then heat the dosimeter substantially beyond the temperature at which there is a peak of luminescence, about 215° C. for lithium fluoride; however, the heating element typically is raised to 315° C. for lithium fluoride. Both the peak and total luminescence are proportional to the total radiation exposure of the dosimeter and either may be determined by means including a photomultiplier tube. However, in operation, photomultiplier tubes have a "dark current" which is one source of system noise and results in inaccurate dosimeter readings. Another source of system noise is black body radiation from the dosimeter and particularly the dosimeter heating element when the dosimeter is heated. Black body radiation is directly proportional to the absolute temperature to the fourth power and also is picked up by the photomultiplier tube. Another source of inaccuracy of readings is the dissipation in nonradiative processes of energy that would otherwise be available for luminescence. This phenomenon is known as thermal quenching and is especially pronounced at temperatures higher than the temperature at peak luminescence of thermoluminescent materials. The practice in prior thermoluminescent dosimeter reading methods is to heat the dosimeter at a relatively slow rate, typically at an average rate of less than 30° C./sec., until the peak of its glow curve is reached. The time required to do this is relatively long because there is considerable thermal lag between the dosimeter heating element temperature and the temperature of the dosimeter since dosimeter materials are poor heat conductors. The final high heating element temperature results in a high intensity of black body radiation and a high degree of thermal quenching while the longer heating time results in a longer period during which dark current flows. In addition, the prior dosimeter reading methods are found to result in long total processing times and to lead to somewhat inconsistent and inaccurate results. Furthermore, the relatively high temperatures to which the dosimeters are normally subjected in the practice of prior methods causes rapid deterioration of plastics which would otherwise be convenient for use as supporting structure, in particular as a matrix in which the thermoluminescent material maybe embedded such as disclosed in U.S. Pat. No. 3,471,699, issued on Oct. 7, 1969, to R. C. McCall.

SUMMARY OF THE INVENTION

In brief, the invention is an improved method for determining the radiation exposure of a thermoluminescent dosimeter by heating the dosimeter as rapidly as possible at an average rate of at least 120° C./sec. to follow a step function that results in a maximum temperature of the dosimeter and its heating element that is not more that 25 percent greater than the temperature at peak luminescence, with the step having a period that extends at least to the termination of luminescence of the dosimeter. By rapid heating, the time required for the thermoluminescent material to reach its peak temperature is shortened, thereby shortening the total heating period; and because the temperature is low and the heating time short, the black body radiation, the degree of thermal quenching and the dark current are minimized. For reasons not yet known, the method of the invention also results in substantially improved reproducibility of total dosimeter luminescence for equal total amounts of irradiation, better than ±1 percent Standard Deviation. Furthermore, the method of the invention has been found to be faster and to produce very stable reader operation with about twice the precision of any known reading method. Precision, reproducibility, fast reading and stability are particularly important in a personnel radiation monitoring system where many individual dosimeters, sometimes ranging in the thousands, must be read. Another advantage of the present invention is that the low temperature to which the dosimeters are heated does not adversely affect many plastics, thus permitting the use of a wide variety of plastics, particularly polytetrafluoroethylene, as a matrix material for the dosimeters.

It is an object of the invention to accurately and consistently read thermoluminescent dosimeters, especially those exposed to low radiation levels.

Another object is to minimize the adverse effects of dark current, black body radiation and thermal quenching during thermoluminescent dosimeter readings.

Another object is to increase the speed of reading thermoluminescent dosimeters.

Another object is to eliminate heat damage to the support structure of a thermoluminescent dosimeter, particularly a translucent plastic support structure.

DESCRIPTION OF AN EMBODIMENT

The invention is a method for reading the radiation exposure of a thermoluminescent dosimeter by heating the dosimeter to follow a step function and includes the steps of very rapidly heating the dosimeter at an average rate of at least 120° C./sec. that results in a relatively low maximum temperature of the dosimeter and its heating element that is not more that 25 percent greater than the temperature in degrees centigrade at which peak luminescence occurs, evenly maintaining the dosimeter at the relatively low temperature for a period that extends at least to the termination of the period of luminescence and sensing the total luminescence of the material. More particularly, the above steps may be performed by rapidly heating a dosimeter to a predetermined low temperature with a resistance heating circuit including a heating element, detecting the temperature of the dosimeter heating element with a temperature sensor such as a lead sulfide cell, and transmitting feedback signals from the temperature sensor through a signal amplifier to a magnetic amplifier or silicon controlled rectifier circuit for controlling the resistance heating circuit to maintain the dosimeter evenly at the attained predetermined temperature. The heating circuit power may be disconnected with a timing circuit at the end of a period that extends at least to the termination of luminescence of the dosimeter. The amount of luminescence from the dosimeter during the heating period may be sensed with a photomultiplier tube by integrating the output of the tube on a capacitance and then feeding the integrated signal to an electrometer through a high impedance input circuit. The output of the electrometer may then be conveniently read with a digital voltmeter.

The method of the invention has been performed with a modified commercial reader, Model No. 4100, purchased from Controls For Radiation, Inc., Cambridge, Massachusetts. The reader was modified to include a heating circuit that heated a planchet of lithium fluoride powder to a temperature of 260° C. in 0.5 seconds. The modified reader also included a lead sulfide cell infrared detector Model No. B3—SA—by Infrared Industries, Waltham, Massachusetts, operating into a signal amplifier for control through suitable circuitry of a magnetic amplifier, Model No. MAO—3, by Freed Transformer Company, Brooklyn, New York, which regulated the heater circuit current to maintain the planchet at an even temperature of 260° C. The heating period of the heating circuit was under control of an electronic timer supply heating current for a period of 10 seconds. Reproducibility was found to be better than ±1 percent Standard Deviation.

While an embodiment of the invention has been shown and described, further embodiments or combinations of these described herein will be apparent to those skilled in the art without departing from the spirit of the invention.

The embodiments of the invention in which I claim an exclusive property or privilege are defined as follows:

1. A method of reading the total exposure to radiation of a thermoluminescent material, including the steps of:
   a. heating the material at an average rate of at least 120° C./sec. to a predetermined temperature at which peak luminescence of the material occurs;
   b. maintaining the temperature of said material evenly at said predetermined temperature for a period that extends to the termination of luminescence of the material; and
   c. sensing the total luminescence of said heated material.

2. The method of claim 1 wherein said predetermined temperature is less than 25 percent higher than the temperature in degrees centigrade at which peak luminescence of the material occurs.

3. The method of claim 1 wherein said predetermined temperature is less than 270° C.

4. The method of claim 1 wherein said temperature maintaining period is less than 10 seconds.

5. The method of claim 1 wherein said thermoluminescent material is lithium fluoride powder.

6. The method of claim 1 wherein said thermoluminescent material is contained in a translucent support and said predetermined temperature is less than the temperature at which said support undergoes heat damage.

7. The method of claim 6 wherein said support is made of polytetrafluoroethylene.

8. The method of claim 6 wherein said support is a matrix in which said thermoluminescent material is embedded.